United States Patent [19]
Hayashi et al.

[11] Patent Number: 5,135,786
[45] Date of Patent: Aug. 4, 1992

[54] SHAPE MEMORY TRANSPARENT BODY AND METHOD OF USING THE SAME

[75] Inventors: Shunichi Hayashi; Yoshiaki Wakita, both of Nagoya, Japan

[73] Assignee: Mitsubishi Jukogyo Kabushiki Kaisha, Tokyo, Japan

[21] Appl. No.: 671,098

[22] Filed: Mar. 18, 1991

Related U.S. Application Data

[63] Continuation-in-part of Ser. No. 420,564, Oct. 12, 1991, abandoned.

[30] Foreign Application Priority Data

Oct. 14, 1988 [JP] Japan .................. 63-257229

[51] Int. Cl.⁵ .................. B29D 22/00; B32B 27/00
[52] U.S. Cl. .................. 428/35.5; 428/423.1; 428/441.1; 264/230
[58] Field of Search .................. 428/35.5, 411.1, 423.1

[56] References Cited

U.S. PATENT DOCUMENTS 3,563,973  2/1971  Arditti et al. .
3,984,516  10/1976  Carrow .
4,505,421  3/1985  Gen et al. .

FOREIGN PATENT DOCUMENTS 1077421  2/1974  Fed. Rep. of Germany .
2344129  3/1975  Fed. Rep. of Germany .
293214  12/1986  Japan .

OTHER PUBLICATIONS

Pat. Abst. of Japan, vol. 11, No. 163, May 26, 1987, JP A 61-293 214 Mitsubishi Heavy Ind. Ltd., Dec. 24, 1986.
Japanese Patent Gazette, Section Ch., Week W52, Feb. 3, 1976, Derwent Publ. Ltd., London GB No. 85323W/52-JP A-50065541 (Dainippon Printing K.K.).

Primary Examiner—P. C. Sluby
Attorney, Agent, or Firm—McAulay Fisher Nissen Goldberg & Kiel

[57] ABSTRACT

A shape memory transparent body formed from a shape memory transparent polymer having a glass transition point higher than the temperature at which the transparent body is used, said transparent body remembering a basic shape, taking on a second shape upon heating to a temperature higher than the glass transition point and subsequent cooling to a temperature lower than the glass transition point, with the transparent body kept deformed by an external force for the setting of the deformed shape, and restoring the basic shape upon heating to a temperature higher than the glass transition point; and a method of using the shape memory transparent body.

12 Claims, 1 Drawing Sheet

SHAPE MEMORY TRANSPARENT BODY AND METHOD OF USING THE SAME

CROSS-REFERENCE TO RELATED APPLICATION

This application is a continuation-in-part of application Ser. No. 420,564, filed Oct. 12, 1989, now abandoned, the contents of which are incorporated herein by reference.

FIELD OF THE INVENTION AND RELATED ART STATEMENT

The present invention relates to a plastic transparent body having the shape memory function and a method of using the same.

Highly transparent plastics have found use as moldings in various shapes such as containers and lenses. These products are given a single shape by molding such as compression molding, injection molding, and extrusion molding, and they are used in the as-molded shape. Transparent plastic bodies are not yet known which can be used not only in the as-molded shape but also in the second deformed shape, or even in the original shape after restoration from the second deformed shape.

OBJECT AND SUMMARY OF THE INVENTION

It is an object of the present invention to provide a transparent body which remembers a first shape (basic shape) and takes on a second shape as well. It is another object of the present invention to provide a method of using the transparent body.

The gist of the present invention resides in a shape memory transparent body formed from a shape memory transparent polymer having a glass transition point higher than the temperature at which the transparent body is used, said transparent body being capable of remembering a basic shape, taking on a second shape upon heating to a temperature higher than the glass transition point and subsequent cooling to a temperature lower than the glass transition point, with the transparent body kept deformed in a desired shape in a frame or proper shape keeping means for the setting of the deformed shape, and restoring the first shape whenever necessary upon heating to a temperature higher than the glass transition point. The gist of the present invention also resides in a method of using the shape memory transparent body.

The present invention provides a shape memory transparent body which remembers a first shape (basis shape), takes on a second shape upon deformation with simple heating operation, and restores its first shape (basis shape) easily when necessary.

DETAILED DESCRIPTION OF PREFERRED EMBODIMENTS

Figure 1:
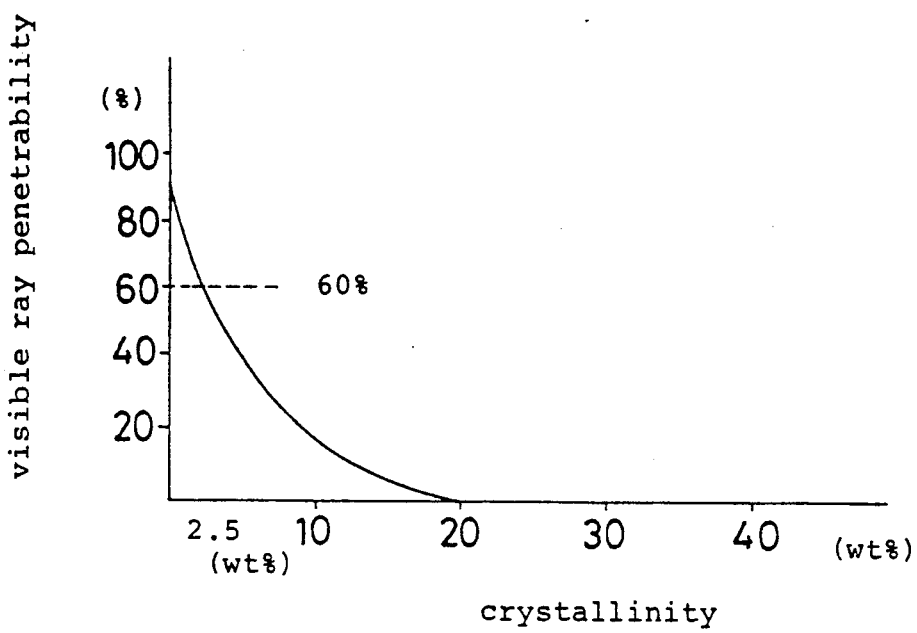
FIG. 1 shows the relationship between crystallinity and penetrability of visible rays.

By the shape memory polymer is generally meant any polymer which remembers its initial molded shape, has its deformed shape set when it is deformed at a temperature higher than the glass transition point (Tg for short hereinafter) of the polymer and lower than the molding temperature of the polymer and then cooled to a temperature lower than the Tg while it is kept deformed, and restores its original molded shape when it is heated to a temperature higher than the Tg. This polymer can be used in two ways according to its as-molded shape and deformed shape which can be selected by a simple heating operation.

According to the present invention, the shape memory transparent body can be produced from any one of the above-defined shape memory polymers which is highly transparent and is easy to heat and cool for deformation. The transparent body remembers the basic memory and takes on the second shape. Therefore, the transparent body can be used effectively in two ways according to its shape, and hence it can be applied to a variety of uses. Examples of the used include window material, adjustable curve rulers, and goldfish globes as illustrated in the embodiments mentioned later. Additional examples include interior decorations (and raw materials thereof) formed by the combination of the transparent bodies in their basic shape such as plate, rod, cylinder, and globe with the transparent bodies in their deformed shape.

The transparent body of the present invention may be produced from any polymer so long as it meets the following requirements. It should be transparent. It should have a Tg higher than the temperature at which the transparent body is used. It should have the shape memory function. It should have a certain level of hardness at the temperature at which the transparent body is used and also have a certain level of softness that permits easy deformation at the temperature at which the transparent body is deformed. It should have a Tg which permits the smooth transition from the basic shape to the second shape.

The transparent body may have physical properties which vary to some extent depending on the kind and formulation of raw materials and the conditions of synthesis, which are selected according to the intended use of the transparent body. The transparent body can be produced by any molding method for plastics, such as injection molding, extrusion molding, blow molding, compression molding, and transfer molding. The first three molding methods are desirable on account of their processing capability.

The shape memory polymer that can be used in the present invention are urethane polymers. Preferable are polyurethanes prepared by prepolymer process from a difunctional diisocyanate, a difunctional polyol, and a difunctional chain extender containing active hydrogen in a molar ration of 2.00–1.10:1.00–0.10, preferably 1.80–1.20:1.00:0.80–0.20. This polyurethane contains NCO groups and OH groups in almost equal amounts at the terminals of the polymer chains. It also has a Tg in the range of −50° to 60° C.

This polymer contains substantially no excess NCO groups at the terminals of the polymer chains and hence contains no allophanate links which form rigid cross-links. Therefore, it is a thermoplastic chain polymer which can be processed freely. In order for the inventive polyurethane to be in the form of a transparent body, it is necessary that it has a visible ray penatrability of at least 60% (as measured on a 1 mm thick film). The crystallinity is preferably less than 2.5 percent by weight. As shown in FIG. 1 to achieve a penetration of at least 60%, the crystallinity should be less than about 2.5% by weight.

Figure 2:
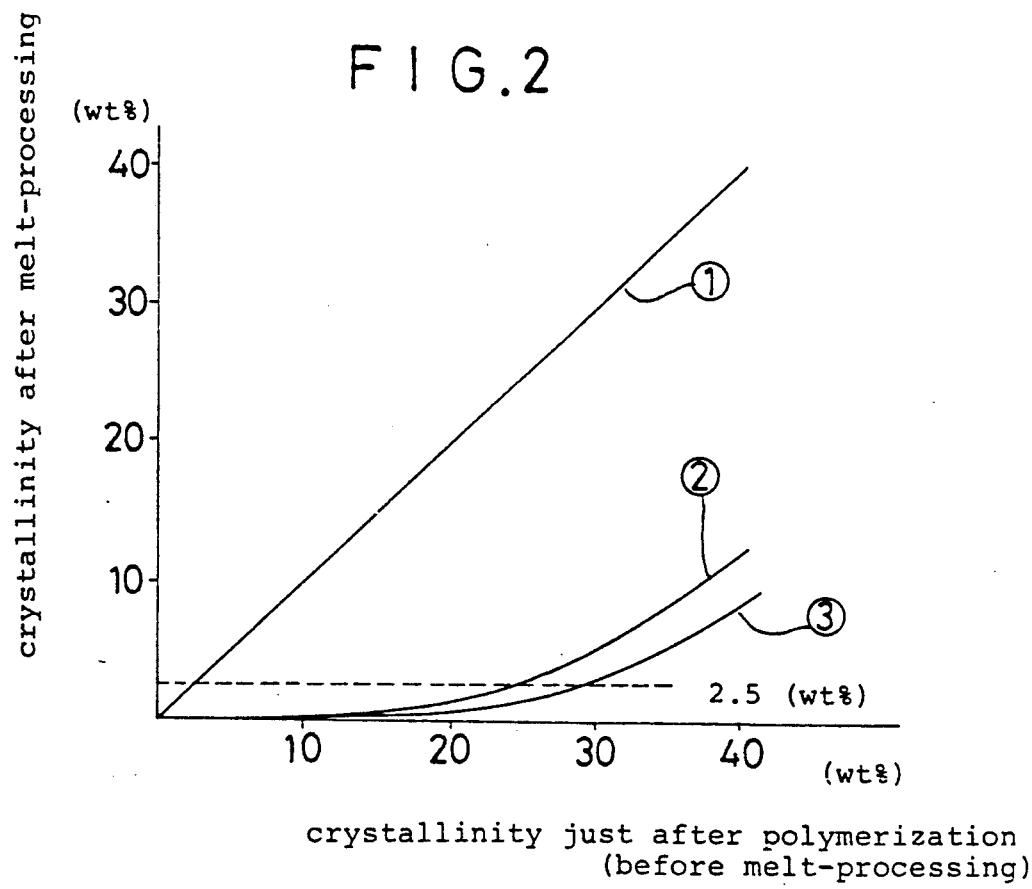
FIG. 2 shows the relationship between crystallinity immediately after polymerization and crystallinity after melt-processing.

As shown in FIG. 2, line 1 when the crystallinity in the polymerized state is less than 2.5 wt %, it remains at the same value after melt processing, e.g., extruding. In this figure, line 2 reflects a case of a single processing (extruding once) and line 3 reflects a case of processing twice. It is also possible to control the crystallinity after melt processing when cooling the polymer.

The crystallinity of the polymer may be controlled by:

a) Increasing the speed of cooling during solidification of the matter polymer into the desired shape. Thus, when film was formed from a melt having a thickness of 0.2 mm at 200° C. and was cooled to 60° C. in five seconds, a transparent film having a crystallinity of 0.7 wt % was obtained;

b) After completion of the melt processing, the crystallinity (calculated stoichiometrically) can be maintained at 2.5 wt % or less by minimizing the content of the chain extender.

The polymer can be produced from the following raw materials, which are illustrative only and not limitative.

The first raw material is a difunctional isocyanate which is represented by the general formula OCN—R—NCO, where R is a group having no or one or two benzene rings. It includes, for example, 2,4-toluene diisocyanate, 4,4'-diphenylmethane diisocyanate, carbodiimide-modified 4,4'-diphenylmethane diisocyanate, and hexamethylene diisocyanate.

The second raw material is a difunctional polyol which is represented by the general formula OH—R'—OH, where R' is a group having no or one or two benzene rings. The second raw material may also be a reaction product of said difunctional polyol and a difunctional carboxylic acid or cyclic ether. It includes, for example, polypropylene glycol, 1,4-butane glycol adipate, polytetramethylene glycol, polyethylene glycol, and an adduct of bisphenol-A with propylene oxide.

The third raw material is a difunctional chain extender containing active hydrogen which is represented by the general formula OH—R'—OH, where R' is a $(CH_2)_n$ group or a group having one or two benzene rings. It includes, for example, ethylene glycol, 1,4-butane glycol, bis(2-hydroxyethyl) hydroquinone, an adduct of bisphenol-A with ethylene oxide, and an adduct of bisphenol-A with propylene oxide.

The above-mentioned three raw materials (isocyanate, polyol, and chain extender) are made into a urethane elastomer (by the aid of an optional catalyst) by prepolymer process in the following manner.

First, the diisocyanate and polyol are reacted in a specific molar ratio of [NCO]/[OH] to give a prepolymer. When the reaction is complete, the chain extender is added in an amount sufficient to establish a desired molar ratio of [chain extender]/[prepolymer]. After defoaming, the resulting mixture is poured into a mold, followed by curing for crosslinking reaction at 80° C. for one or two days in a constant temperature dryer. This process may be carried out with or without solvent.

The polyurethane elastomer produced as mentioned above will have a Tg and other physical properties as desired, if the following six factors are properly selected. (1) the kind of the isocyanate, (2) the kind of the polyol, (3) the kind of the chain extender, (4) the [NCO]/[OH] molar ration, (5) The [chain extender]/[prepolymer] molar ratio, and (6) the curing condition.

The thus produced polyurethane elastomer may be represented by the following general formula:

HOR'OCONH
(RNHCOOR'OCONH)$_n$RNHCOOR-
'OCONH(RNHCOOROCONH)$_n$RNHCOOR-
'OH where m is 1–16 and n is 0–16

The following illustrates the production of the shape memory polyurethane. First, a prepolymer was prepared by reacting, in the absence of catalyst, an isocyanate component and a polyol component in the ratio shown in Table 1. To the prepolymer was added a chain extender in the ratio shown in Table 1. The resulting mixture was heat-cured to give shape memory polyurethane, which had the basic physical properties as shown in Table 1.

In Table 1, E/E' represents the ratio of the tensile modulus at a temperature 10° C. lower than Tg to the tensile modulus at a temperature 10° C. higher than Tg. The crystallinity (wt%) was measured by X-ray diffractometry. The Tg (°C.) was measured by the DSC method (differential scanning calorimetry). The tensile modulus was measured according to the method provided in JIS K-7113 (Japanese Industrial Standards).

TABLE 1

| Raw materials and molar ratio | | M.W. | 1 | 2 | 3 | 4 | 5 | 6 | 7 | 8 | 9 | 10 |
|---|---|---|---|---|---|---|---|---|---|---|---|---|
| Diisocyanate | 2,4-toluene diisocyanate | 174 | 1.5 | | | 1.5 | | | | | | |
| | 4,4'-diphenylmethane diisocyanate | 250 | | | | | 1.5 | | | 1.5 | 1.5 | 1.5 |
| | 4,4'-diphenylmethane diisocyanate (carbodiimide-modified) | 290 | | | | | | 1.5 | | | | |
| | 4,4'-diphenylmethane diisocyanate (carbodiimide-modified) | 303 | | 1.5 | 1.5 | | | | | | | |
| | hexamethylene diisocyanate | 168 | | | | | | | 1.5 | | | |
| Polyol | polypropylene glycol | 400 | | | | | | | | | | |
| | " | 700 | | | 1.0 | 1.0 | 1.0 | 1.0 | 1.0 | 1.0 | 1.0 | 1.0 |
| | " | 1000 | | 0.88 | | | | | | | | |
| | 1,4-butaneglycol adipate | 600 | | | | | | | | | | |
| | " | 1000 | | | | | | | | | | |
| | " | 2000 | | | | | | | | | | |
| | polytetramethylene glycol | 650 | | | | | | | | | | |
| | " | 850 | | | | | | | | | | |
| | " | 1000 | | | | | | | | | | |
| | polyethylene glycol | 600 | | | | | | | | | | |
| | bisphenol-A + propylene oxide | 800 | 1.0 | | | | | | | | | |
| Chain extender | ethylene glycol | 62 | | | | | | | | 0.51 | | |
| | 1,4-butane glycol | 90 | | 0.51 | | | | | | | 0.51 | |
| | bis(2-hydroxyethyl)hydroquinone | 198 | | | | | | | | | | |

TABLE 1-continued

|  |  | M.W. | | | | | | | | | |
|---|---|---|---|---|---|---|---|---|---|---|---|
|  | bisphenol-A + ethylene oxide | 327 |  |  |  |  |  |  |  |  |  |
|  | " | 360 |  | 0.51 | 0.51 | 0.51 | 0.51 | 0.51 | 0.51 |  |  |
|  | bisphenol-A + propylene oxide | 360 |  |  |  |  |  |  |  |  |  | 0.51 |
| Measured values of physical properties | Tg (°C.) | | 24 | −10 | 15 | −11 | 14 | 16 | −45 | 9 | 6 | 12 |
|  | E/E' | | 170 | 73 | 69 | 23 | 129 | 133 | 20 | 117 | 128 | 97 |
|  | Crystallinity (wt %) | |  | 20 | 20 | 30 |  |  | 25 |  |  |  |

| Raw materials and molar ratio | | M.W. | 11 | 12 | 13 | 14 | 15 | 16 | 17 | 18 | 19 | 20 |
|---|---|---|---|---|---|---|---|---|---|---|---|---|
| Diisocyanate | 2,4-toluene diisocyanate | 174 |  |  |  |  |  |  |  |  |  |  |
|  | 4,4'-diphenylmethane diisocyanate | 250 | 1.5 | 1.5 | 1.5 | 1.2 | 1.8 | 1.35 | 1.35 | 1.35 | 1.35 | 1.35 |
|  | 4,4'-diphenylmethane diisocyanate (carbodiimide-modified) | 290 |  |  |  |  |  |  |  |  |  |  |
|  | 4,4'-diphenylmethane diisocyanate (carbodiimide-modified) | 303 |  |  |  |  |  |  |  |  |  |  |
|  | hexamethylene diisocyanate | 168 |  |  |  |  |  |  |  |  |  |  |
| Polyol | polypropylene glycol | 400 |  |  |  |  |  |  |  |  |  |  |
|  | " | 700 | 1.0 | 1.0 |  | 1.0 | 1.0 | 1.0 |  |  |  |  |
|  | " | 1000 |  |  |  |  |  |  | 1.0 |  |  |  |
|  | 1,4-butaneglycol adipate | 600 |  |  |  |  |  |  |  | 1.0 |  |  |
|  | " | 1000 |  |  |  |  |  |  |  |  | 1.0 |  |
|  | " | 2000 |  |  |  |  |  |  |  |  |  | 1.0 |
|  | polytetramethylene glycol | 650 |  |  |  |  |  |  |  |  |  |  |
|  | " | 850 |  |  |  |  |  |  |  |  |  |  |
|  | " | 1000 |  |  |  |  |  |  |  |  |  |  |
|  | polyethylene glycol | 600 |  |  | 1.0 |  |  |  |  |  |  |  |
|  | bisphenol-A + propylene oxide | 800 |  |  |  |  |  |  |  |  |  |  |
| Chain extender | ethylene glycol | 62 |  |  |  |  |  |  |  |  |  |  |
|  | 1,4-butane glycol | 90 |  |  |  |  |  |  |  |  |  |  |
|  | bis(2-hydroxyethyl)hydroquinone | 198 |  | 0.51 |  |  |  |  |  |  |  |  |
|  | bisphenol-A + ethylene oxide | 327 | 0.51 |  |  | 0.21 | 0.81 | 0.36 | 0.36 | 0.36 | 0.36 | 0.36 |
|  | " | 360 |  |  |  |  |  |  |  |  |  |  |
|  | bisphenol-A + propylene oxide | 360 |  |  |  |  |  |  |  |  |  |  |
| Measured values of physical properties | Tg (°C.) | | 16 | −7 | −6 | −4 | 25 | 5 | −22 | 10 | −18 | −45 |
|  | E/E' | | 111 | 49 | 12 | 105 | 53 | 37 | 81 | 100 | 29 | 30 |
|  | Crystallinity (wt %) | |  | 20 | 30 |  | 20 | 25 |  |  | 25 | 25 |

| Raw materials and molar ratio | | M.W. | 21 | 22 | 23 | 24 | 25 | 26 | 27 | 28 | 29 | 30 |
|---|---|---|---|---|---|---|---|---|---|---|---|---|
| Diisocyanate | 2,4-toluene diisocyanate | 174 |  |  |  |  |  |  | 1.5 | 1.4 | 1.3 | 1.2 |
|  | 4,4'-diphenylmethane diisocyanate | 250 | 1.35 | 1.35 | 1.35 | 1.5 | 1.5 | 1.35 |  |  |  |  |
|  | 4,4'-diphenylmethane diisocyanate (Carbodiimide-modified) | 290 |  |  |  |  |  |  |  |  |  |  |
|  | 4,4'-diphenylmethane diisocyanate (carbodiimide-modified) | 303 |  |  |  |  |  |  |  |  |  |  |
|  | hexamethylene diisocyanate | 168 |  |  |  |  |  |  |  |  |  |  |
| Polyol | polypropylene glycol | 400 |  |  |  |  |  | 1.0 |  |  |  |  |
|  | " | 700 |  |  |  | 1.0 | 1.0 |  |  |  |  |  |
|  | " | 1000 |  |  |  |  |  |  |  |  |  |  |
|  | 1,4-butaneglycol adipate | 600 |  |  |  |  |  |  |  |  |  |  |
|  | " | 1000 |  |  |  |  |  |  |  |  |  |  |
|  | " | 2000 |  |  |  |  |  |  |  |  |  |  |
|  | polytetramethylene glycol | 650 | 1.0 |  |  |  |  |  |  |  |  |  |
|  | " | 850 |  | 1.0 |  |  |  |  |  |  |  |  |
|  | " | 1000 |  |  | 1.0 |  |  |  |  |  |  |  |
|  | polyethylene glycol | 600 |  |  |  |  |  |  |  |  |  |  |
|  | bisphenol-A + propylene oxide | 800 |  |  |  |  |  |  | 1.0 | 1.0 | 1.0 | 1.0 |
| Chain extender | ethylene glycol | 62 |  |  |  |  |  |  |  |  |  |  |
|  | 1,4-butane glycol | 90 |  |  |  |  |  |  |  |  |  |  |
|  | bis(2-hydroxyethyl)hydroquinone | 198 |  |  |  |  |  |  | 0.51 | 0.41 | 0.31 | 0.21 |
|  | bisphenol-A + ethylene oxide | 327 | 0.36 | 0.36 | 0.36 | 0.43 | 0.35 | 0.36 |  |  |  |  |
|  | " | 360 |  |  |  |  |  |  |  |  |  |  |
|  | bisphenol-A + propylene oxide | 360 |  |  |  |  |  |  |  |  |  |  |
| Measured values of physical properties | Tg (°C.) | | −18 | −30 | −38 | 5 | 8 | 23 | 26 | 21 | 19 | 19 |
|  | E/E' | | 33 | 18 | 40 | 33 | 100 | 126 | 140 | 125 | 108 | 101 |
|  | Crystallinity (wt %) | | 25 | 25 |  | 25 | 15 | 15 | 10 | 15 | 15 | 15 |

| Raw materials and molar ratio | | M.W. | 31 | 32 | 33 | 34 | 35 | 36 | 37 | 38 | 39 | 40 |
|---|---|---|---|---|---|---|---|---|---|---|---|---|
| Diisocyanate | 2,4-toluene diisocyanate | 174 |  |  | 1.5 |  |  |  |  |  |  |  |
|  | 4,4'-diphenylmethane diisocyanate | 250 | 1.59 | 1.68 |  | 1.3 | 1.7 | 1.59 | 1.68 | 1.5 | 1.5 | 1.81 |
|  | 4,4'-diphenylmethane diisocyanate (carbodiimide-modified) | 290 |  |  |  |  |  |  |  |  |  |  |
|  | 4,4'-diphenylmethane diisocyanate (carbodiimide-modified) | 303 |  |  |  |  |  |  |  |  |  |  |
|  | hexamethylene diisocyanate | 168 |  |  |  |  |  |  |  |  |  |  |
| Polyol | polypropylene glycol | 400 |  |  |  |  |  |  |  |  |  |  |
|  | " | 700 | 1.0 | 1.0 |  | 1.0 | 1.0 | 1.0 | 1.0 |  |  |  |
|  | " | 1000 |  |  |  |  |  |  |  |  |  |  |
|  | 1,4-butaneglycol adipate | 600 |  |  |  |  |  |  |  |  |  |  |
|  | " | 1000 |  |  |  |  |  |  |  |  |  |  |
|  | " | 2000 |  |  |  |  |  |  |  |  |  |  |
|  | polytetramethylene glycol | 650 |  |  |  |  |  |  |  |  |  |  |
|  | " | 850 |  |  |  |  |  |  |  |  |  |  |
|  | " | 1000 |  |  |  |  |  |  |  |  |  |  |

TABLE 1-continued

| | | | | | | | | | | | | |
|---|---|---|---|---|---|---|---|---|---|---|---|---|
| | polyethylene glycol | 600 | | | | | | | | | | |
| | bisphenol-A + propylene oxide | 800 | | 1.0 | | | | | 1.0 | 1.0 | 1.0 | |
| Chain extender | ethylene glycol | 62 | | | 0.31 | 0.71 | 0.51 | 0.51 | | | | |
| | 1,4-butane glycol | 90 | | | | | | | 0.51 | | | |
| | bis(2-hydroxyethyl)hydroquinone | 198 | | 0.51 | | | | | | 0.51 | 0.81 | |
| | bisphenol-A + ethylene oxide | 327 | | | | | | | | | | |
| | " | 360 | 0.51 | 0.51 | | | | | | | | |
| | bisphenol-A + propylene oxide | 360 | | | | | | | | | | |
| Measured values of physical | | Tg (°C.) | 10 | 11 | 22 | 2 | 15 | 11 | 12 | 35 | 40 | 48 |
| properties | | E/E' | 126 | 126 | 107 | 83 | 122 | 100 | 135 | 124 | 138 | 152 |
| | | Crystallinity (wt %) | 15 | 20 | 15 | 20 | 15 | 15 | 10 | 10 | 5 | 5 |

EMBODIMENT 1

The present invention was applied to fitting a transparent plate into an integrally formed round window frame (10 cm in diameter, with a 2 mm deep groove) of an alarm clock. First, polymer having a Tg of 48° C. was prepared by prepolymer process according to the formulation of Example No. 40 shown in Table 1. The polymer was made into a transparent body (3-mm thick plate) by extrusion molding. The plate was cut into a disc 10.4 mm in diameter as a window material. This window material was fitted into a frame-like jig which was capable of tightening the periphery of the window material. With the window material heated to about 70° C., the jig was tightened so that the window material became slightly smaller than 10 cm in diameter. Subsequently, the window material was allowed to cool to room temperature, so that the deformed shape was set. The window material was fitted into the frame of the alarm clock. Upon heating to about 60° C., the window material restored its original flat shape in 7-8 seconds, snugly fitting into the window frame. Incidentally, this window material has a refractive index of 1.48 and a modulus of about 10000 kgf/cm² at room temperature.

EMBODIMENT 2

A polymer having a Tg of 40° C. was prepared by prepolymer process according to the formulation of Example No. 39 shown in Table 1. The polymer was made into a quadrangular prism (5mm×5 mm) by extrusion molding. The quadrangular prism was cut into a 30-cm long ruler. This ruler remembers the as-molded straight shape and hence it can be used as a straightedge as such. This ruler can also be used as an adjustable curve ruler when it is deformed in a desired shape. The deformation is accomplished by heating the ruler to about 50° C. or above, and the deformation is set when the heated ruler is cooled to room temperature by blowing a cooling gas from a gas bomb.

Unlike the conventional adjustable curve ruler which retains its curved shape with difficulty, the ruler in this embodiment retains its curved shape indefinitely during use. After use as an adjustable curve ruler, the ruler restored its original straight shape when it is heated to about 50° C. or above with an air blow dryer, and the ruler can be used as a straightedge.

EMBODIMENT 3

A polymer having a Tg of 35° C. was prepared by prepolymer process according to the formulation of Example No. 38 shown in Table 1. The polymer was made into a goldfish globe (2.5 mm thick and 30 cm in diameter) by blow molding.

The goldfish globe was heated in hot water at about 50° C. and then collapsed by the application of forces to both sides. The goldfish globe was cooled to room temperature to set the collapsed shape. The collapsed shape is convenient for transportation and storage on account of its reduced size.

Prior to use as the goldfish globe, the collapsed goldfish globe was heated in hot water at 50° C. or above for the restoration of its global shape. Incidentally, the goldfish globe was provided with a shell mark when it was impressed with a shell mark while it was still hot before cooling to room temperature.

As the above-mentioned embodiments show, the present invention provides a transparent body which remembers a first shape (basic shape), takes on a second shape upon deformation with simple heating operation, and restores its basic shape easily when necessary owing to its shape memory performance.

We claim:

1. A shape memory transparent body of a shape memory transparent polyurethane polymer formed from a bifunctional isocyanate, a bifunctional polyol, and a bifunctional chain extender containing an active hydrogen group, the molecular ratios of each of the components being 2.00–1.10:1.00:1.00–0.10 and having a glass transition point higher than the temperature at which the transparent body is used and a crystallinity of no more than about 2.5 wt %, said transparent body remembering a basic shape, said body prepared by:
   a) forming the polymer into a first shape;
   b) heating said shaped body to a temperature higher than the glass transition point;
   c) cooling the heated body to a temperature lower than the glass transition point of the polymer;
   d) shaping said transparent body into a second shape; and then,
   e) heating the body from step d) at a temperature higher than the glass transition point of the polymer to restore the body to the first shape.

2. The transparent body of claim 1 having a glass transition point from about 50° to 60° C.

3. The transparent body of claim 1 wherein the difunctional isocyanate has the formula OCN—R—NCO, wherein R is a group having no more than two benzene rings.

4. The transparent body of claim 3 wherein the difunctional isocyanate is selected from the group consisting of 2,4-toluene diisocyanate, 4,4′-diphenylmethane diisocyanate, carbodiimide-modified 4,4′-diphenylmethane diisocyanate, and hexamethylene diisocyanate.

5. The transparent body of claim 2 wherein the difunctional polyol has the formula OH—R′—OH wherein R′ is a group having no more than two benzene rings.

6. The transparent body of claim 5 wherein the difunctional polyol is selected from the group consisting of the reaction products of difunctional polyols and a difunctional carboxylic acid or cyclic ether.

7. A shape memory transparent body of a shape memory transparent urethane polymer formed from a bifunctional isocyanate, a bifunctional polyol, and a bifunctional chain extender containing an active hydrogen group, the molecular ratios of each of the components being 2.00–1.10:1.00:1.00–0.10, the crystallinity of the polymer being no more than about 2.5 weight percent and said polymer having a visible ray penetration of at least 60%, the polymer exhibiting a rubbery state at a temperature less than the glass transition point, a glassy state at a temperature greater than the glass transition point, and being capable of remembering a first shape after being heated to a temperature above the glass transition point and formed into a second shape different from the first shape and cooled below the glass transition point while being maintained in the second shape so that upon heating to a temperature above the glass transition point, the polymer resumes the first shape.

8. The transparent body of claim 7 having a glass transition point from about 50° to 60° C.

9. The transparent body of claim 7 wherein the difunctional isocyanate has the formula OCN—R—NCO, wherein R is a group having no more than two benzene rings.

10. The transparent body of claim 9 wherein the difunctional isocyanate is selected from the group consisting of 2,4-toluene diisocyanate, 4,4'-diphenylmethane diisocyanate, carbodiimide-modified 4,4'-diphenylmethane diisocyanate, and hexamethylene diisocyanate.

11. The transparent body of claim 10 wherein the difunctional polyol has the formula OH—R'—OH wherein R' is a group having no more than two benzene rings.

12. The transparent body of claim 11 wherein the difunctional polyol is selected from the group consisting of the reaction products of difunctional polyols and a difunctional carboxylic acid or cyclic ether.

* * * * *

UNITED STATES PATENT AND TRADEMARK OFFICE
CERTIFICATE OF CORRECTION

PATENT NO. : 5,135,786
DATED : August 4, 1992
INVENTOR(S) : Shunichi Hayashi et al It is certified that error appears in the above-indentified patent and that said Letters Patent is hereby corrected as shown below:

On the title page, Item [63] Related U.S. Application Data should read ––Continuation-in-part of Ser. No. 420,564, Oct. 12, 1989, abandoned.

Signed and Sealed this

Twelfth Day of October, 1993

Attest:

Attesting Officer

BRUCE LEHMAN

Commissioner of Patents and Trademarks